United States Patent
Reddy et al.

(10) Patent No.: US 10,897,326 B2
(45) Date of Patent: Jan. 19, 2021

(54) SHARING A SINGLE CORESET BANDWIDTH ACROSS MULTIPLE USER EQUIPMENTS

(71) Applicant: QUALCOMM Incorporated, San Diego, CA (US)

(72) Inventors: Akula Reddy, San Diego, CA (US); Jing Sun, San Diego, CA (US); Tao Luo, San Diego, CA (US); Sony Akkarakaran, Poway, CA (US); Rahul Malik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/934,745

(22) Filed: Mar. 23, 2018

(65) Prior Publication Data
US 2018/0302186 A1      Oct. 18, 2018

Related U.S. Application Data

(60) Provisional application No. 62/485,540, filed on Apr. 14, 2017.

(51) Int. Cl.
*H04L 1/00* (2006.01)
*H04L 5/00* (2006.01)

(52) U.S. Cl.
CPC .......... *H04L 1/0072* (2013.01); *H04L 5/0005* (2013.01); *H04L 5/0053* (2013.01);
(Continued)

(58) Field of Classification Search
CPC ... H04L 1/0072; H04L 5/0005; H04L 5/0046; H04L 5/0053
See application file for complete search history.

(56) References Cited

U.S. PATENT DOCUMENTS

2017/0273058 A1*  9/2017  Agiwal ................. H04W 16/28
2017/0367046 A1* 12/2017  Papasakellariou .. H04W 72/042
(Continued)

OTHER PUBLICATIONS

Interdigital Communications: "UE Power Savings with Bandwidth Adaptation for NR", 3GPP Draft; R2-1702880 (R15 NR WI AI10317 C-DRX), 3rd Generation Partnership Project (3gpp), Mobile Competence Centre; 650, Route Des Lucioles; F-06921 Sophia-Antipol, vol. RAN WG2, No. Spokane, USA; 20170403-20170407 Apr. 3, 2017, XP051244860, Retrieved from the Internet: URL:http://www.3gpp.org/ftp/Meetings_3GPP_SYNC/RAN2/Docs/ [retrieved on Apr. 3, 2017], 4 pages.
(Continued)

*Primary Examiner* — Rasheed Gidado
(74) *Attorney, Agent, or Firm* — Arent Fox LLP

(57) ABSTRACT

In an aspect of the disclosure, a method, a computer-readable medium, and an apparatus are provided. The apparatus may determine a coreset of time and frequency resources within a control region of a coreset bandwidth. In one aspect, the coreset bandwidth may be based on a minimum bandwidth configuration associated with one or more UEs in a set of UEs. The apparatus may also transmit a PDCCH as a single-carrier waveform via the coreset of time and frequency resources. In one aspect, the PDCCH may be transmitted to each UE in the set of UEs using the coreset bandwidth.

14 Claims, 15 Drawing Sheets

(52) U.S. Cl.
CPC .......... *H04L 5/0094* (2013.01); *H04L 5/0046* (2013.01); *H04L 5/0051* (2013.01); *H04L 5/0055* (2013.01)

(56) References Cited

U.S. PATENT DOCUMENTS

| | | | |
|---|---|---|---|
| 2018/0049203 A1* | 2/2018 | Xue ...................... | H04L 5/0035 |
| 2018/0063865 A1* | 3/2018 | Islam .................... | H04W 76/27 |
| 2018/0070369 A1* | 3/2018 | Papasakellariou ..... | H04B 7/024 |
| 2018/0192383 A1* | 7/2018 | Nam ................... | H04W 56/001 |
| 2018/0227934 A1* | 8/2018 | Yang .................... | H04W 72/14 |
| 2018/0279289 A1* | 9/2018 | Islam ................ | H04W 72/1242 |

OTHER PUBLICATIONS

International Search Report and Written Opinion—PCT/US2018/024339—ISA/EPO—dated Jun. 27, 2018.

Samsung: "Considerations for Flexible Bandwidth in NR", 3GPP Draft; R2-1703451 Considerations for Flexible Bandwidth in NR, 3rd Generation Partnership Project (3gpp), Mobile Competence Centre; 650, Route Des Lucioles; F-06921 Sophia-Antipol, vol. RAN WG2, No. Spokane, USA; 20170403-20170407 Apr. 3, 2017, XP051245307, Retrieved from the Internet: URL:http://www.3gpp.org/ftp/Meetings_3GPP_SYNC/RAN2/Docs/ [retrieved on Apr. 3, 2017], 6 pages.

Samsung: "Single Carrier Wide BW Operational Aspects", 3GPP Draft; R1-1700941 Single Carrier Wide BW Operational Aspects, 3rd Generation Partnership Project (3gpp), Mobile Competence Centre; 650, Route Des Lucioles; F-06921 Sophia-Antipol, vol. RAN WG1, No. Spokane, US; 20170116-20170120 Jan. 16, 2017, XP051208457, Retrieved from the Internet: URL:http://www.3gpp.org/ftp/Meetings_3GPP_SYNC/RAN1/Docs/ [retrieved on Jan. 16, 2017], 5 pages.

* cited by examiner

SHARING A SINGLE CORESET BANDWIDTH ACROSS MULTIPLE USER EQUIPMENTS

CROSS-REFERENCE TO RELATED APPLICATION(S)

This application claims the benefit of U.S. Provisional Application Ser. No. 62/485,540, entitled "SHARING A SINGLE CORESET BANDWIDTH ACROSS MULTIPLE USER EQUIPMENTS" and filed on Apr. 14, 2017, which is expressly incorporated by reference herein in its entirety.

BACKGROUND

Field

The present disclosure relates generally to communication systems, and more particularly, to sharing a single control resource set (coreset) bandwidth across multiple user equipments (UEs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple-access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

The transmit signals using an OFDMA waveform may have high peak values in the time domain since many subcarrier components may be added via an inverse fast Fourier transformation (IFFT) operation prior to transmission. As a result, systems communicating using OFDMA waveforms may experience a high peak-to-average power ratio (PAPR) as compared to single-carrier systems. A high PAPR may cause a base station to transmit at a lower power, and hence have a reduced coverage area (e.g., reduced link budget). A high PAPR may be particularly detrimental in a 5G NR system that operates using millimeter wave (mmW) frequencies and/or near mmW frequencies because communications using the mmW/near mmW radio frequency band may experience extremely high path loss and a short range.

There is a need to provide a waveform that reduces the PAPR in order to increase the transmit power of a base station, and hence increase the coverage area in a 5G NR system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The transmit signals an OFDMA system may have high peak values in the time domain since many subcarrier components are added via an IFFT operation prior to transmission. As a result, systems communicating using OFDMA waveforms may experience a high PAPR as compared to single-carrier systems. A high PAPR may cause a base station to transmit at a lower power, and hence have a reduced coverage area (e.g., reduced link budget). A high PAPR may be particularly detrimental in a 5G NR system that operates using mmW frequencies and/or near mmW frequencies because communications using the mmW/near mmW radio frequency band may experience extremely high path loss and a short range. There is a need to enable a 5G NR system with a waveform that reduces the PAPR in order to increase the transmit power of the base station, and hence increase the coverage area.

Single carrier waveforms, such as a discrete Fourier transform (DFT) spreading frequency division multiple access (DFT-S-FDMA) waveform, may provide a lower PAPR as compared to an OFDMA waveform because the spreading may be across frequency and not time. Hence, the peak values in the time domain may be lower since only a single subcarrier component is added via an IFFT operation prior to transmission. Consequently, transmitting an NR physical downlink control channel (NR-PDCCH) in a 5G NR system using a DFT-S-FDMA waveform may be beneficial.

A coreset may be a set of time-frequency domain resources, defined in units of resource element groups (REGs). Each REG may comprise a fixed number (e.g. twelve) tones in one symbol period (e.g., a symbol period of a slot), where one tone in one symbol period is referred to as a resource element (RE). A fixed number of REGs may be included in a control channel element (CCE). Sets of CCEs may be used to transmit an NR-PDCCH, with different numbers of CCEs in the sets used to transmit an NR-PDCCH using differing aggregation levels. The sets of CCEs may be defined as search spaces for UEs, and thus a base station may transmit an PDCCH to a UE in a set of CCEs that may be defined as a search space for the UE. In addition, a UE may monitor a search space within the UE's configured bandwidth in order to decode the coreset and receive the NR-PDCCH transmitted by the base station.

Because different UEs in communication with the base station may have different bandwidth configurations, the base station may transmit coresets to UEs in different bandwidths. For example, a UE with a bandwidth configuration of 150 MHz may receive a coreset within 0 MHz to 150 MHz range. However, a UE with a 300 MHz bandwidth may receive a coreset within the 150 MHz to 300 MHz range. Transmitting coresets in different bandwidths may increase system overhead and system complexity.

There is a need to reduce system overhead and system complexity by enabling UEs with different bandwidth configurations to share the same bandwidth that is used by the UEs to monitor and decode for the resources allocated a particular UE.

The present disclosure may provide a solution by transmitting a coreset using a single coreset bandwidth so that UEs with different bandwidth configurations may monitor the same bandwidth and decode the resources allocated to a particular UE. Based on the aspects of the preset disclosure, a 5G NR system may provide flexibility for each UE to be able to use the same coreset resources to obtain respective control information, thereby reducing system overhead and system complexity.

In an aspect of the disclosure, a method, a computer-readable medium, and an apparatus are provided. The apparatus may determine a coreset of time and frequency resources within a control region of a coreset bandwidth. In one aspect, the coreset bandwidth may be based on a minimum bandwidth configuration associated with one or more UEs in a set of UEs. The apparatus may also transmit a PDCCH as a single-carrier waveform via the coreset of time and frequency resources. In one aspect, the PDCCH may be transmitted to each UE in the set of UEs using the coreset bandwidth.

In another aspect, the apparatus may monitor a coreset bandwidth for a coreset of time and frequency resources. In one aspect, the coreset bandwidth may be based on a minimum bandwidth configuration associated with one or more UEs in a set of UEs. The apparatus may also receive a PDCCH via the coreset of time and frequency resources from a base station. In one aspect, the PDCCH may be received in the coreset bandwidth as a single-carrier waveform.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
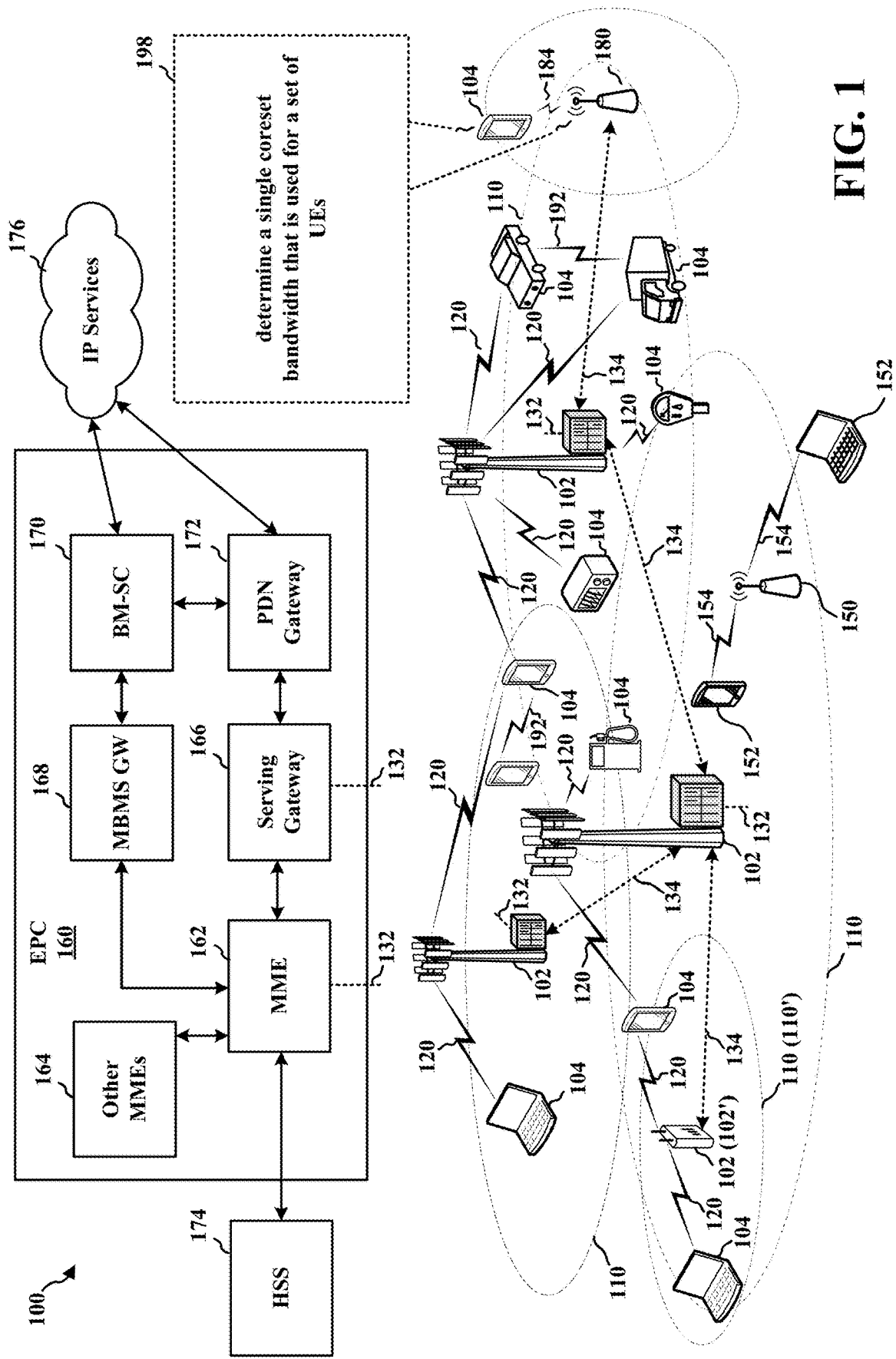
FIG. 1 is a diagram illustrating an example of a wireless communications system and an access network.
Figure 2:
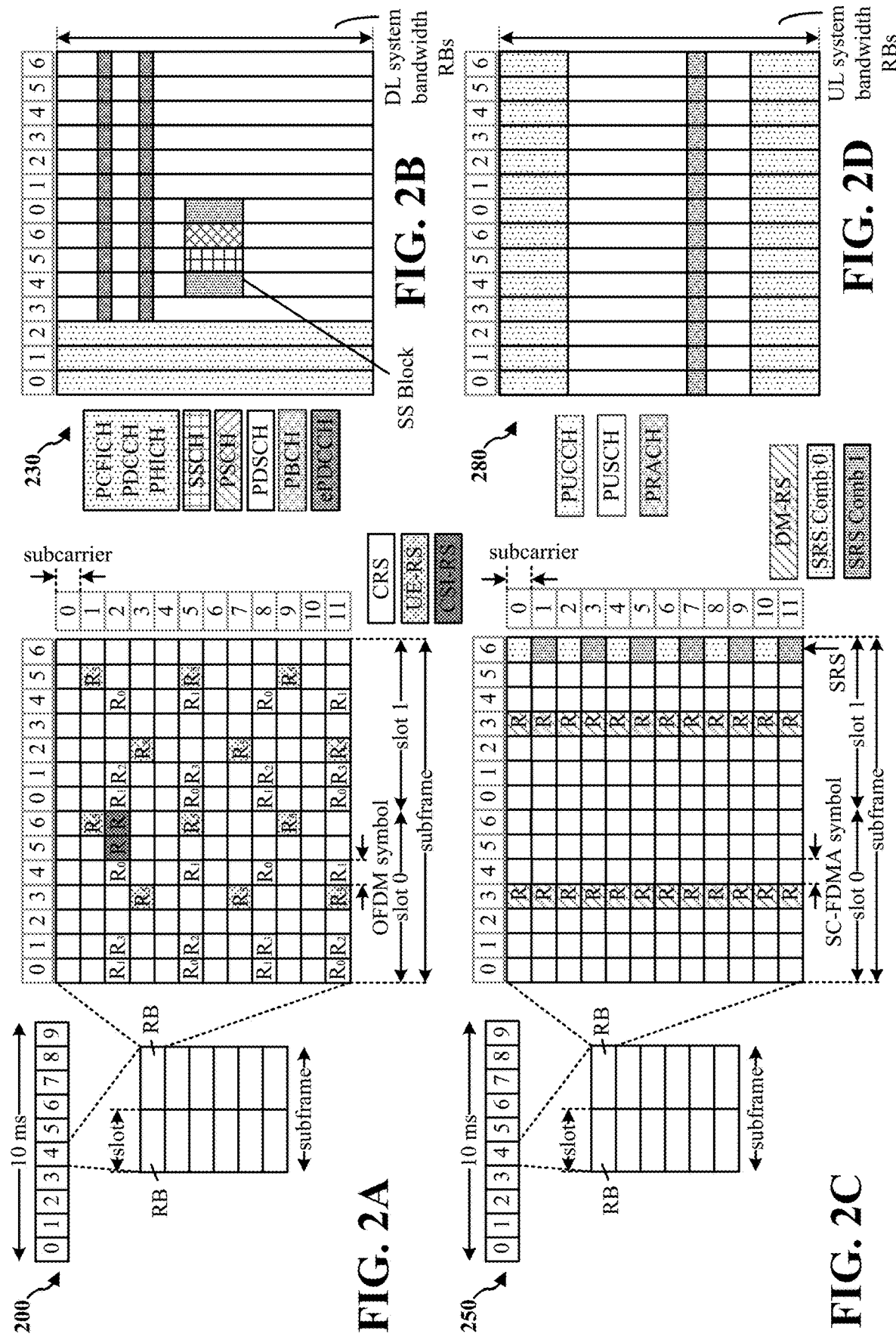
FIGS. 2A, 2B, 2C, and 2D are diagrams illustrating examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC

160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to determine a single coreset bandwidth that is used for a set of UEs 104 (198), e.g., as described below in connection with any of FIGS. 2A-14.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
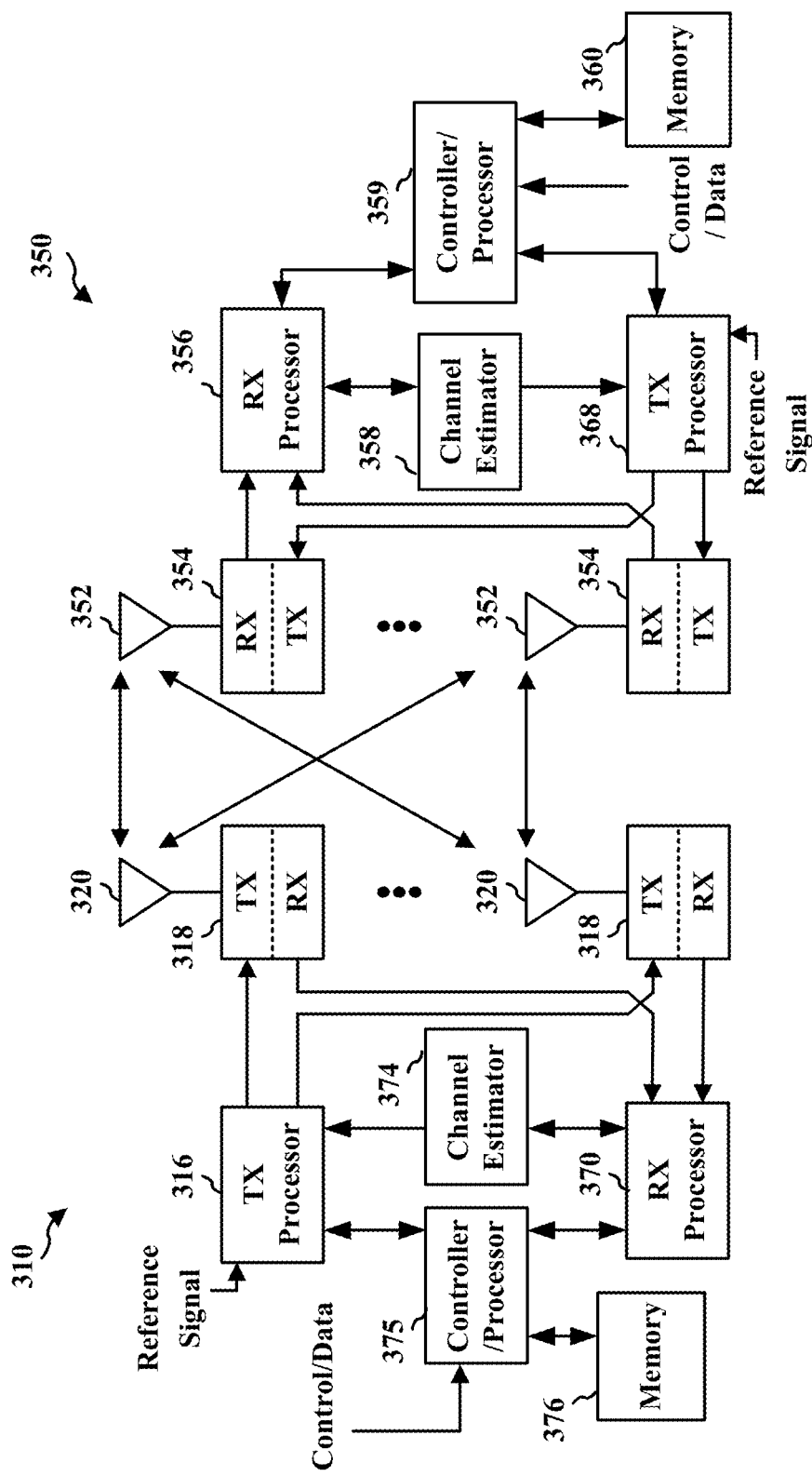
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
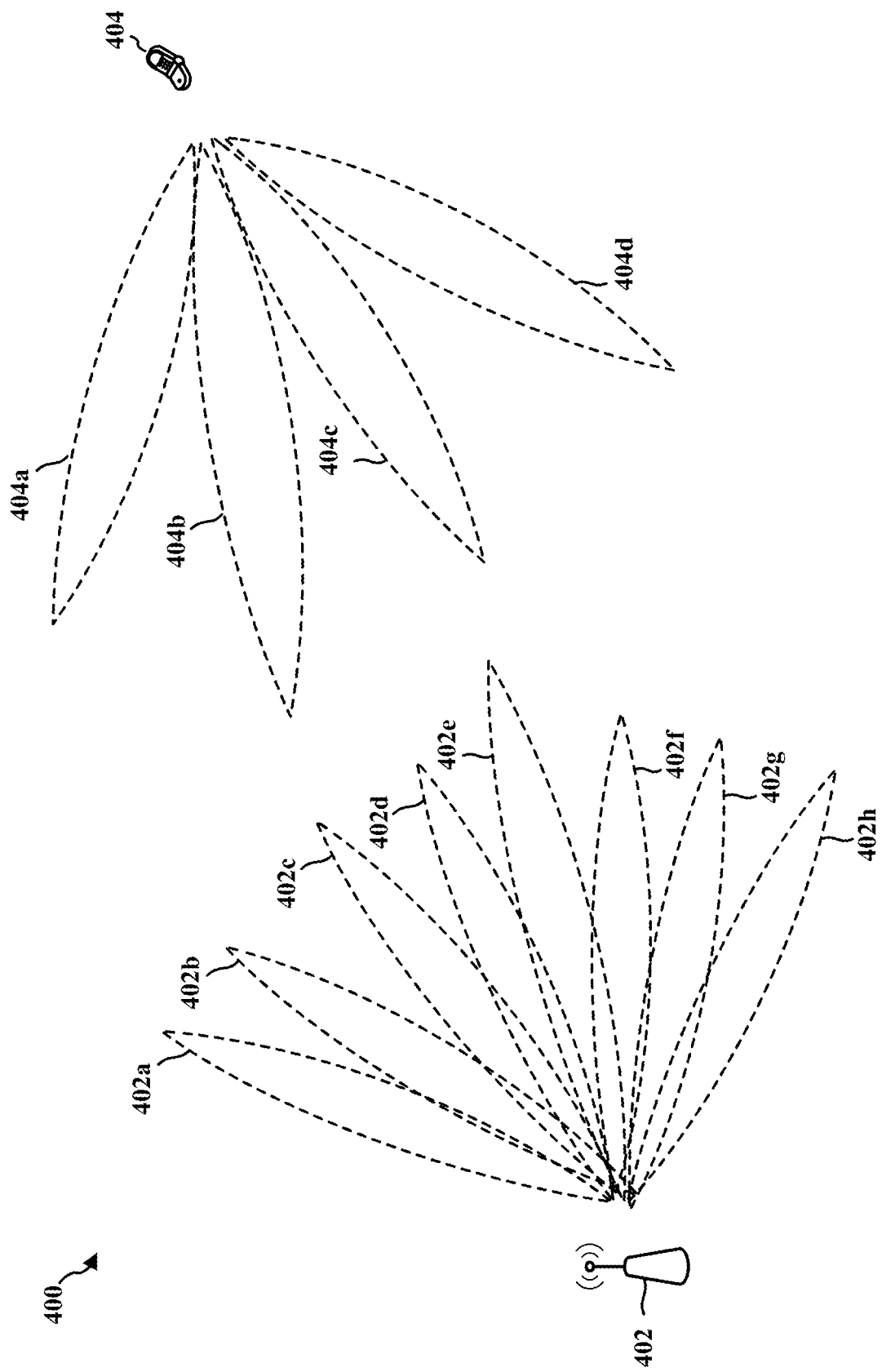
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In communications systems operating according to mmW NR (e.g., 5G) standards, single carrier waveforms, in addition to OFDMA waveforms, may be used by devices to extend the DL link budget. That is, use of a single carrier waveform may improve power levels of received downlink signals at receiving devices. The single carrier waveform may allow a lower PAPR of the signal, which may allow a PA of a transmit chain to use a higher transmit power level. DFT-S-FDMA is one type of single carrier waveform that may be used for downlink signals to allow a higher transmit power level, thereby increasing the coverage area of a base station.

According to certain aspects of the present disclosure, a single carrier waveform designed for transmitting PDSCH may be also be used for transmitting PDCCH. Using a waveform that UEs are already capable of receiving (e.g., single carrier waveforms designed for transmitting PDSCH) may be advantageous over designing a different waveform for transmitting PDCCH, because UE receivers may receive the single carrier PDCCHs with the same receive chain components that UE receivers use in receiving single carrier PDSCHs.

In certain aspects of the present disclosure, a coreset for an OFDMA system (e.g., a communications system transmitting PDCCH using OFDMA waveforms) may comprise one or more control resource (e.g., time and frequency resources) sets configured for conveying PDCCH, within the system bandwidth. Within each coreset, one or more search spaces (e.g., common search space (CSS), UE-specific search space (USS)) may be defined for a given UE.

According to certain aspects of the present disclosure, a coreset may include a set of time-frequency domain resources, defined in units of REGs. Each REG may comprise a fixed number (e.g. twelve) of tones in one symbol period (e.g., a symbol period of a slot), where one tone in one symbol period is referred to as a RE. A fixed number of REGs may be included in a CCE. Sets of CCEs may be used to transmit NR-PDCCH, and different numbers of CCEs in the sets may be used to transmit NR-PDCCH using differing aggregation levels. The sets of CCEs may be defined as search spaces for UEs, and thus, a base station may transmit an NR-PDCCH to a UE by transmitting the NR-PDCCH in a set of CCEs that is defined as a search space for the UE. The UE may receive the NR-PDCCH by searching in search spaces for the UE and decoding the NR-PDCCH transmitted by the base station.

In certain aspects of the present disclosure, a base station may use different techniques of forming CCEs from REGs and mapping NR-PDCCHs to CCEs for different UEs, thus allowing multiple options for transmitting NR-PDCCHs to multiple UEs in one coreset.

According to aspects of the present disclosure, mapping of an OFDMA NR-PDCCH to CCEs in a frequency domain may use a localized or distributed approach. That is, an NR-PDCCH may be mapped to a set of adjacent tones (localized approach) or spread across tones that are not adjacent in a bandwidth (distributed approach).

In aspects of the present disclosure, a demodulation reference signal (DMRS) may be associated with an NR-PDCCH. The DMRS may be used in determining channel state by a device receiving the NR-PDCCH, and the device may use the channel state in receiving, demodulating, and/or decoding the NR-PDCCH. The DMRS may be embedded in the NR-PDCCH or transmitted as a wideband signal in the coreset. If the DMRS is embedded in the NR-PDCCH, then some CCEs used in transmitting the NR-PDCCH may be used to transmit the embedded DMRS, which may reduce the total quantity of control data conveyed by the CCEs used in transmitting the NR-PDCCH. If the DMRS is transmitted as a wideband signal, then CCEs used to transmit an NR-PDCCH may each convey control data, since none of the CCEs are used to transmit an embedded DMRS.

Because different UEs in communication with the base station may have different bandwidth configurations, the base station may transmit coresets to UEs in different bandwidths. For example, a UE with a bandwidth configuration of 150 MHz may receive a coreset within the within 0 MHz to 150 MHz range. However, a UE with a 300 MHz bandwidth may receive a coreset within the 150 MHz to 300 MHz range. Transmitting coresets in different bandwidths may increase system overhead and system complexity.

There is a need to reduce system overhead and system complexity by enabling UEs with different bandwidth configurations to share the same coreset bandwidth to monitor and decode the resources allocated a particular UE.

The present disclosure may provide a solution by transmitting a coreset using a single coreset bandwidth so that UEs with different bandwidth configurations may monitor the same bandwidth for the coreset and NR-PDCCH. Based on the aspects of the preset disclosure, a 5G NR system may enable UEs with different bandwidth configurations to use the same coreset resources to obtain control information, thereby reducing system overhead and system complexity.

Figure 5:
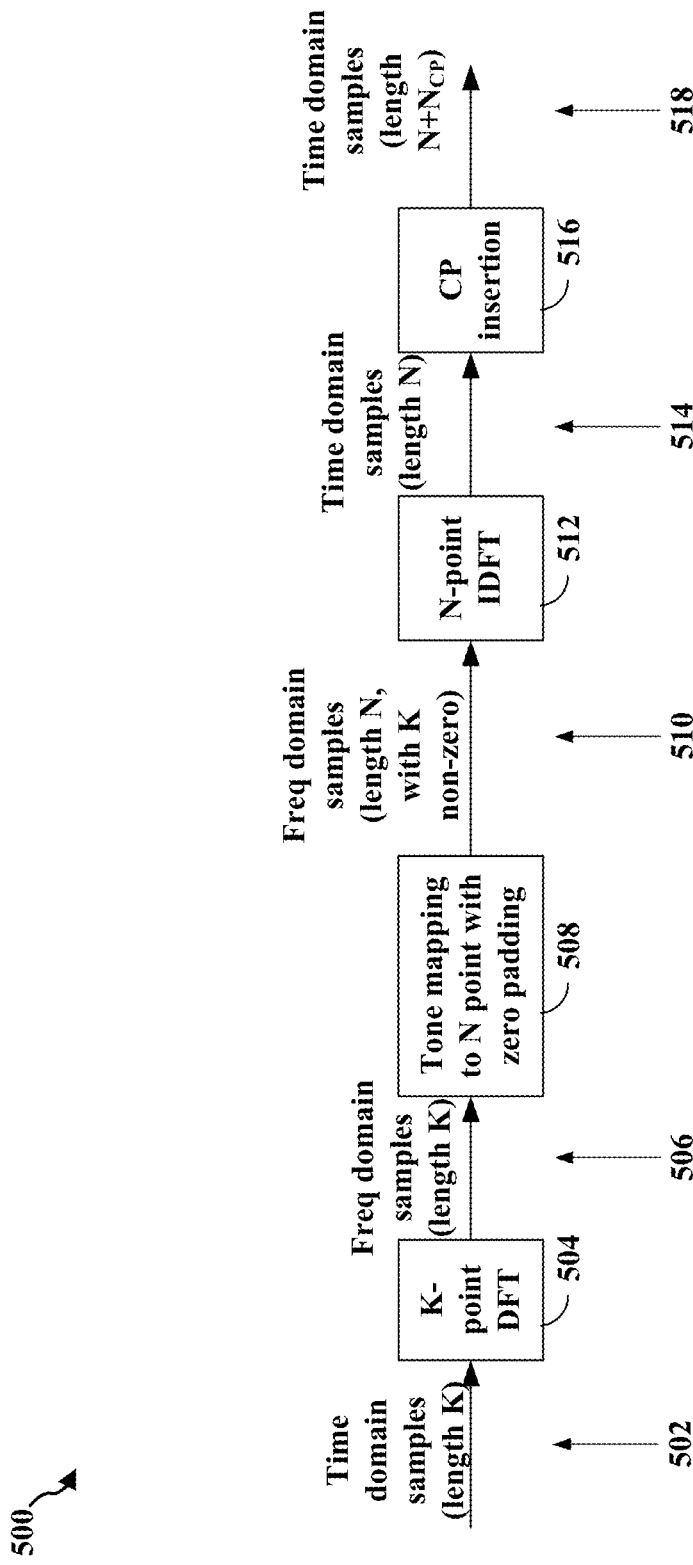
FIG. 5 is a diagram illustrating generating a DFT-S-FDMA waveform signal in accordance with certain aspects of the present disclosure.

FIG. 5 illustrates example operations 500 for generating a DFT-S-FDMA waveform signal, such as a PDCCH transmitted using a DFT-S-FDMA waveform. The operations 500 may be performed by one or more of the controller/processor 375 and/or transmit processor 316, shown in FIG. 3. Operations 500 begin by obtaining K time domain samples 502 representing data (e.g., control data of a PDCCH) to be transmitted. The K time domain samples may be obtained from a data source (not shown) or from the controller/processor 375. The K time domain samples may be processed through a K-point discrete Fourier transform (DFT)

at 504 to generate K frequency domain samples 506. The K-point DFT may be performed by the controller/processor 375 and/or the transmit processor 316. The K frequency domain samples 506 may be combined with N-K zeroes (e.g., zero padding) and mapped at 508 to N tones to generate N frequency domain samples 510. The mapping to the N tones may be performed by the transmit processor 316. The N frequency domain samples may be processed through an N-point inverse discrete Fourier transform (IDFT) at 512 to generate N time domain samples 514. The IDFT may be performed by the transmit processor 316. A cyclic prefix (CP) of length $N_{CP}$ 516 may be formed by copying $N_{CP}$ time domain samples from the end of the N time domain samples and inserting those $N_{CP}$ time domain samples at the beginning of the N time domain samples to generate N+$N_{CP}$ time domain samples 518. The N+$N_{CP}$ time domain samples 518 may then be transmitted, e.g., via CCEs included in a search space of a UE that is an intended recipient of the transmission.

Figure 6:
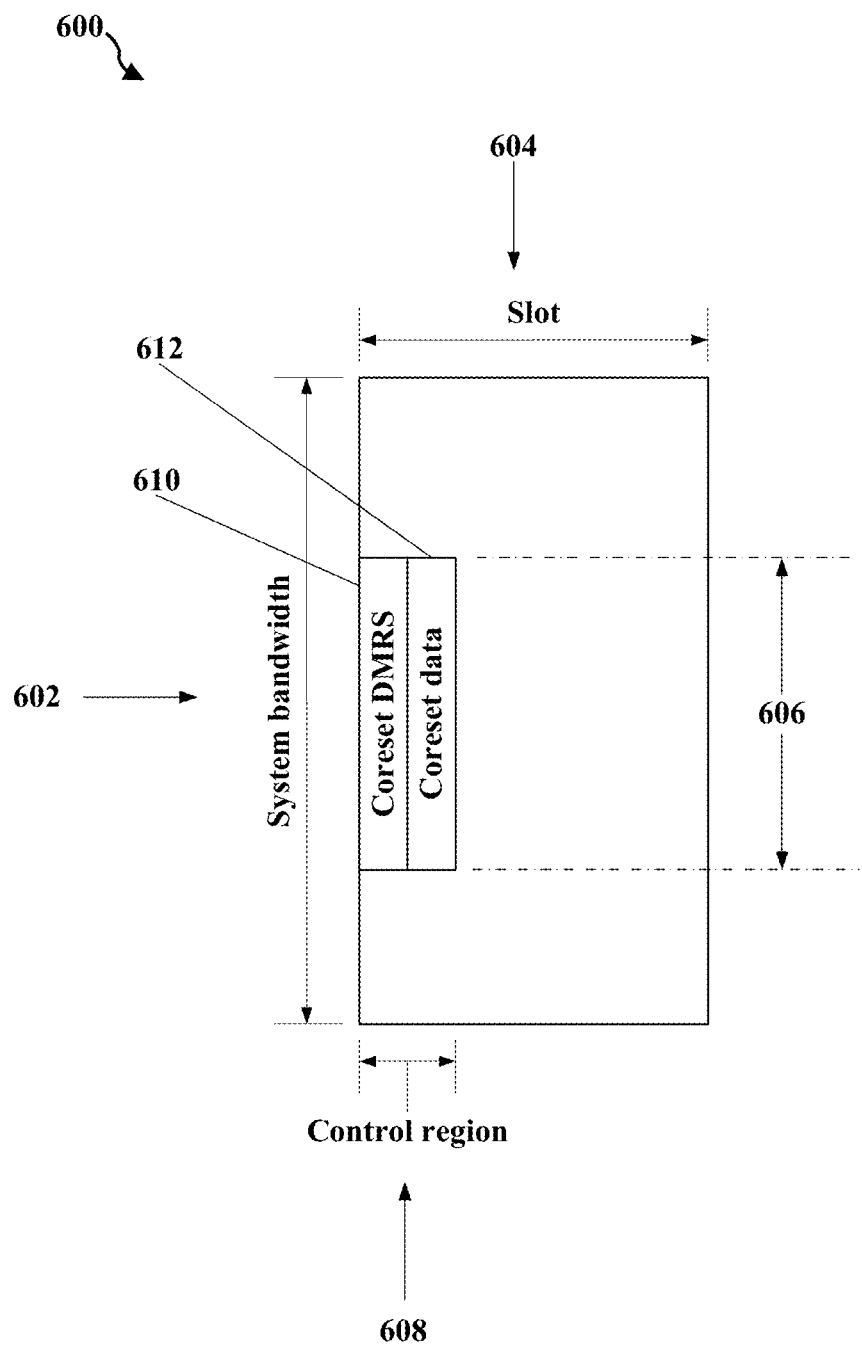
FIG. 6 is a diagram illustrating time frequency resource mapping in accordance with certain aspects of the present disclosure.

FIG. 6 shows an exemplary time frequency resource mapping 600 in accordance with certain aspects of the present disclosure. The exemplary time frequency resource mapping shows an example system bandwidth 602 during a period of an exemplary slot 604. An example set of frequency resources, shown at 606, may be defined as a coreset. An example set of time resources, shown at 608, may also define the coreset. The coreset time resources may also be referred to as a control region. In the example coreset, the time resources may be divided into two periods (e.g., two symbol periods), with a first period 610 used for transmitting a DMRS for the coreset and a second period 612 used for transmitting the coreset data (e.g., DCIs). In one aspect, the first period 610 used for transmitting the DMRS may be wideband to cover the entire coreset.

According to aspects of the present disclosure, a data portion of a PDCCH (e.g., data transmitted in the second period 612) may convey multiple DCIs. The multiple DCIs may be intended for one UE, e.g., conveying both a downlink grant and an uplink grant. Additionally or alternatively, the multiple DCIs may be intended for multiple UEs, for example, multiple DCIs may convey both a downlink grant and an uplink grant to a first UE, two downlink grants to a second UE, and an uplink grant to a third UE.

Figure 7:
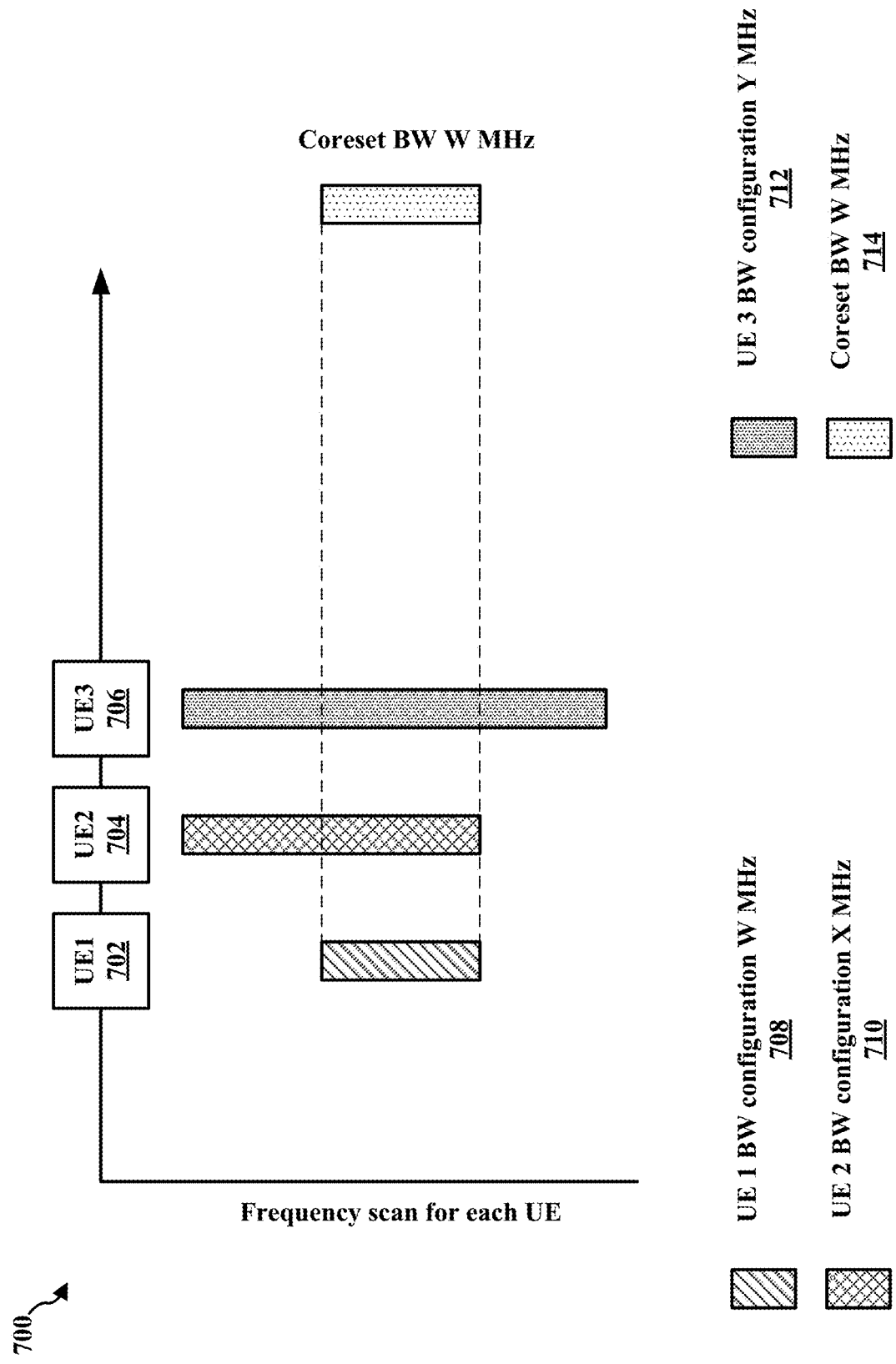
FIG. 7 is a diagram illustrating a frequency scan procedure that may be performed by UEs with different bandwidth configurations in order to monitor and decode resources allocated by a base station in accordance with certain aspects of the disclosure.

FIG. 7 illustrates a diagram 700 of a frequency scan procedure that may be performed by a first UE 702, a second UE 704, and a third UE 706 in order to monitor and decode coreset resources allocated by a base station (e.g., not illustrated in FIG. 7) within a coreset bandwidth 714 in accordance with aspects of the present disclosure. The first UE 702 may correspond to, e.g., UE 104, 350, 802, 1050, 1055, apparatus 1302/1302'. The second UE 704 may correspond to, e.g., UE 104, 350, 804, 1050, 1055, apparatus 1302/1302'. The third UE 706 may correspond to, e.g., UE 104, 350, 806, 1050, 1055, apparatus 1302/1302'. In addition, the first UE 702, the second UE 704, and the third UE 706 may be located in a serving cell of a mmW base station, and configured to communicate with the mmW base station using the mmW spectrum (e.g., 30 GHz to 300 GHz). In one aspect, the subcarrier spacing within the mmW spectrum may be 3.75 KHz, 7.5 KHz, or 15 KHz.

In the example illustrated in FIG. 7, the first UE 702 is depicted as having a bandwidth configuration of W MHz 708 (e.g. M×15 KHz=W MHz, where M is the number of subcarriers in the bandwidth configuration of the first UE 702). In addition, the second UE 704 is depicted as having a bandwidth configuration of X MHz 710 (e.g., N×15 KHz=X MHz, where N is the number of subcarriers in the bandwidth configuration of the second UE 704, and W<X). Further, the third UE 706 is depicted as having a bandwidth configuration of Y MHz 712 (e.g., P×15 KHz=Y MHz, and W<X<Y).

In addition, the coreset bandwidth 714 may be defined as the minimum bandwidth configuration of the set of UEs 702, 704, 706. By defining the coreset bandwidth 714 as the minimum bandwidth configuration of the UEs, the first UE 702, the second UE 704, and the third UE 706 may be able to use the same coreset resources to obtain control information. In other words, the coreset resources for each of the first UE 702, the second UE 704, and the third UE 706 may be located within the coreset bandwidth 714 (e.g., W MHz), which may enable each of the UEs to monitor the same bandwidth and decode the respective coreset control information.

Figure 8A:
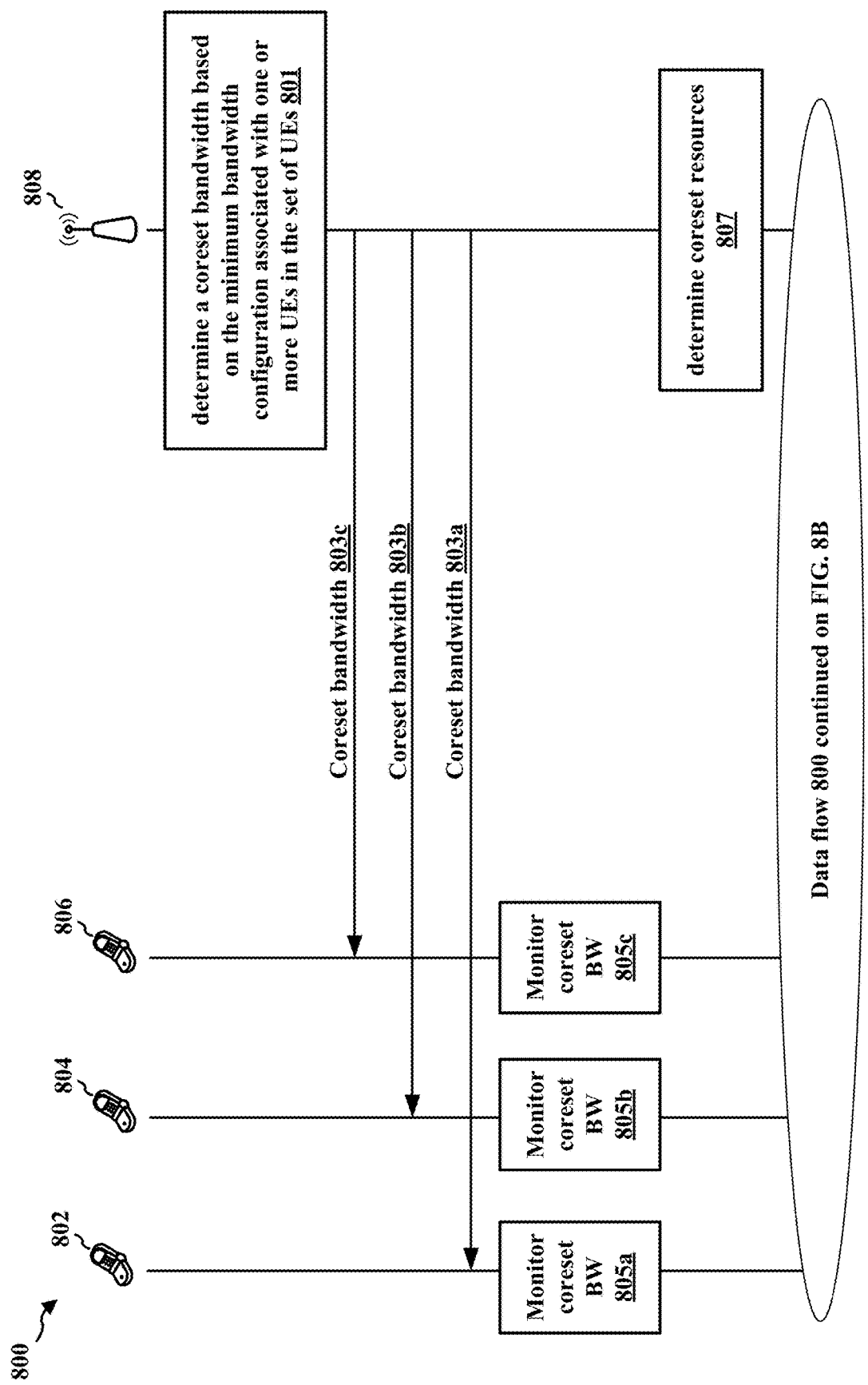
FIGS. 8A and 8B illustrate a data flow that may be used by a base station to provide a set of UEs with different bandwidth configurations with respective coreset resources located within the same coreset bandwidth in accordance with aspects of the present disclosure.
Figure 8B:
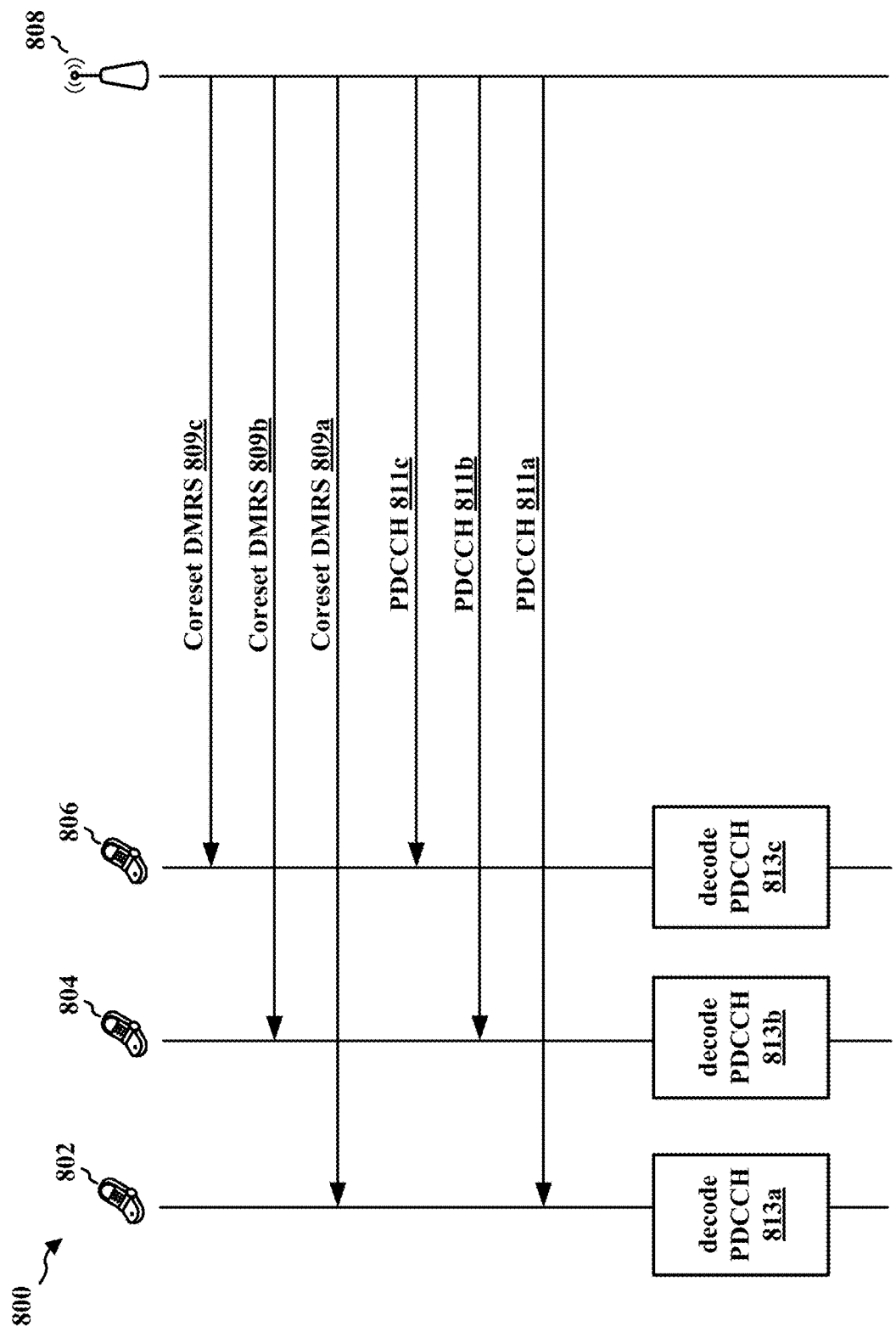

FIGS. 8A and 8B illustrate a data flow 800 that may be used by a base station 808 to provide a set of UEs 802, 804, 806 that have different bandwidth configurations with respective coreset resources within the same coreset bandwidth in accordance with aspects of the present disclosure.

For example, the base station 808 may correspond to, e.g., base station 102, 180, 310, 1350, the apparatus 1002/1002'. The first UE 802 may correspond to, e.g., UE 104, 350, 702, 1050, 1055, apparatus 1302/1302'. The second UE 804 may correspond to, e.g., UE 104, 350, 704 1050, 1055, apparatus 1302/1302'. The third UE 806 may correspond to, e.g., UE 104, 350, 706, 1050, 1055, apparatus 1302/1302'. In addition, the first UE 802, the second UE 804, and the third UE 806 may be located in region of the base station 808, and be configured to communicate with the base station 808 using the mmW spectrum (e.g., 30 GHz to 300 GHz). In one aspect, the subcarrier spacing within the mmW spectrum may be 3.75 KHz, 7.5 KHz, or 15 KHz.

Referring to FIG. 8A, the base station 808 may determine 801 a coreset bandwidth based on the minimum bandwidth configuration associated one or more UEs in the set of UEs 802, 804, 806. For example, assume the first UE 802 has a bandwidth configuration of W MHz (e.g. M×15 KHz=W MHz, where M is the number of subcarriers in the bandwidth configuration of the first UE 802). In addition, assume the second UE 804 has a bandwidth configuration of X MHz (e.g., N×15 KHz=X MHz, where N is the number of subcarriers in the bandwidth configuration of the second UE 804, and W<X). Further, assume the third UE 806 has a bandwidth configuration of Y MHz (e.g., P×15 KHz=Y MHz, where P is the number of subcarriers in the bandwidth configuration of the third UE 806, and W<X<Y). In addition, assume the coreset bandwidth is defined as the minimum bandwidth configuration. Hence, based on the example described supra, the base station 808 may determine 801 that the coreset bandwidth is W MHz.

Further, the base station 808 may transmit information 803a, 803b, 803c associated with the coreset bandwidth to the first UE 802, the second UE 804, and the third UE 806, respectively.

Each of the first UE 802, the second UE 804, and the third UE 806 may use the information 803a, 803b, 803c associated with the coreset bandwidth to determine a bandwidth to monitor 805a, 805b, 805c for coreset resources. For example, the first UE 802, the second UE 804, and the third UE 806 may monitor 805a, 805b, 805c the coreset bandwidth for coreset resources transmitted by the base station 808.

In addition, the base station 808 may determine 807 a coreset of time and frequency resources within a control region of the coreset bandwidth, and referring to FIG. 8B, transmit a DMRS 809*a*, 809*b*, 809*c* associated with the PDCCH (e.g., an NR-PDCCH) within a first symbol period (e.g., see 610 in FIG. 6) of the control region in the coreset bandwidth to each of the first UE 802, the second UE 804, and the third UE 806, respectively.

Further, the base station 808 may transmit a PDCCH 811*a*, 811*b*, 811*c* as a single-carrier waveform (e.g., DFT-S-FDMA waveform) to the first UE 802, the second UE 804, and the third UE 806, respectively. For example, the PDCCH 811*a*, 811*b*, 811*c* may be transmitted via the coreset of time and frequency resources using the coreset bandwidth. In one aspect, transmitting the PDCCH 811*a*, 811*b*, 811*c* may include transmitting data of the PDCCH in a second symbol period (e.g., see 612 in FIG. 6) of the control region in the coreset bandwidth. Each of the first UE 802, the second UE 804, and the third UE 806 may decode 813*a*, 813*b*, 813*c* respective coreset control information from the PDCCH.

A mmW communication system that implements the data flow 800 depicted in FIGS. 8A and 8B may be able to reduce system overhead and system complexity by enabling UEs with different bandwidth configurations to use the same coreset resources to obtain coreset control information from a PDCCH.

Figure 9:
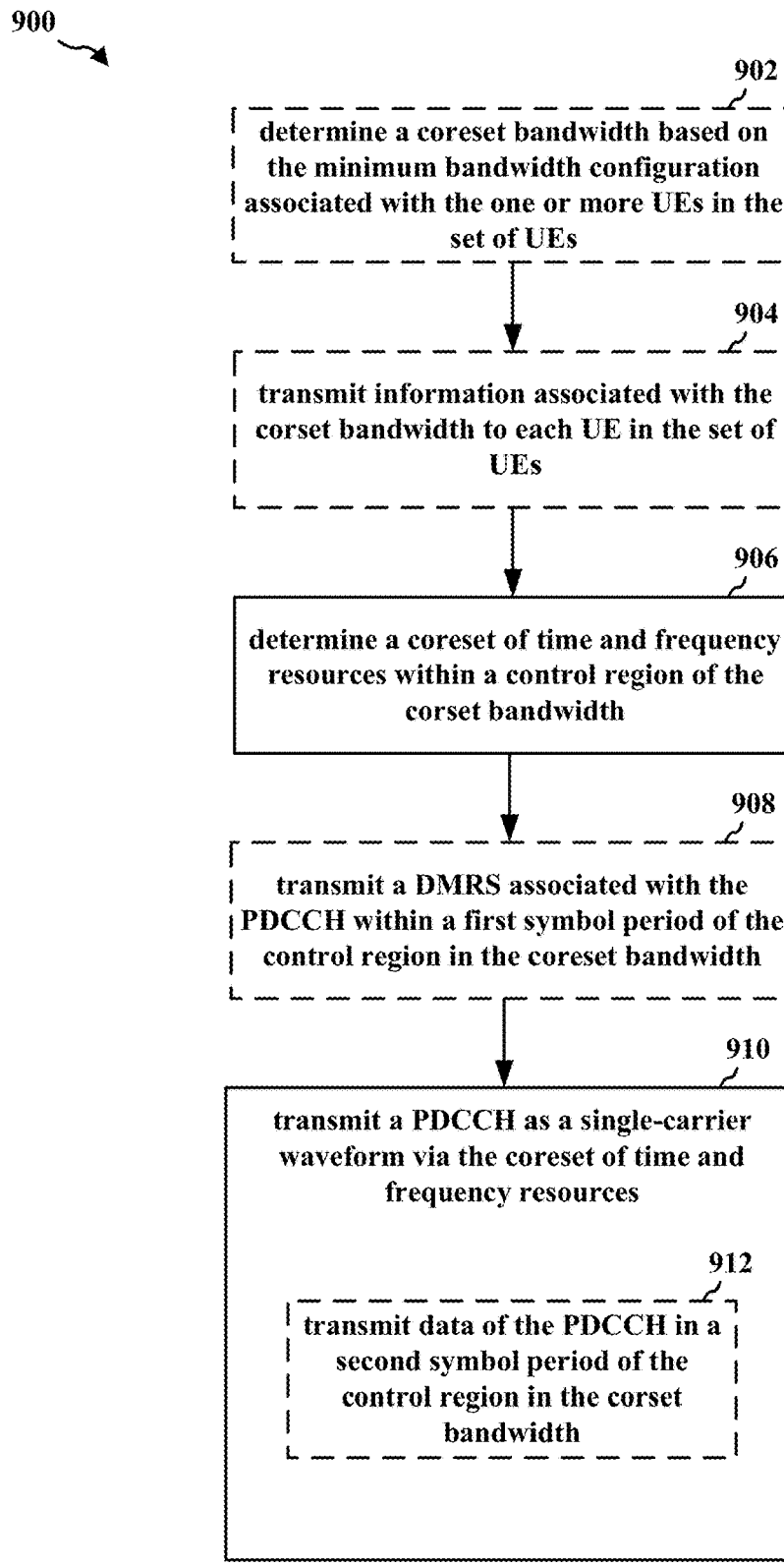
FIG. 9 is a flowchart of a method of wireless communication.

FIG. 9 is a flowchart 900 of a method of wireless communication. The method may be performed by a base station (e.g., the base station 102, 180, 310, 808, 1350, the apparatus 1002/1002') in communication with a UE (e.g., the UE 104, 350, 702, 704, 706, 802, 804, 806, 1050, 1055, apparatus 1302/1302'). In FIG. 9, optional operations are indicated with dashed lines.

At 902, the base station may determine a coreset bandwidth based on a minimum bandwidth configuration associated with one or more UEs in a set of UEs. In one aspect, each UE in the set of UEs may be located within a region associated with the base station. For example, referring to FIG. 8A, the base station 808 may determine 801 a coreset bandwidth based on the minimum bandwidth configuration associated one or more UEs in the set of UEs 802, 804, 806. For example, assume the first UE 802 has a bandwidth configuration of W MHz (e.g. M×15 KHz=W MHz, where M is the number of subcarriers in the bandwidth configuration of the first UE 802). In addition, assume the second UE 804 has a bandwidth configuration of X MHz (e.g., N×15 KHz=X MHz, where N is the number of subcarriers in the bandwidth configuration of the second UE 804, and W<X). Further, assume the third UE 806 has a bandwidth configuration of Y MHz (e.g., P×15 KHz=Y MHz, where P is the number of subcarriers in the bandwidth configuration of the third UE 806, and W<X<Y). In addition, assume the coreset bandwidth is defined as the minimum bandwidth configuration of the set of UEs 802, 804, 806. Hence, based on the example described supra, the base station 808 may determine 801 that the coreset bandwidth is W MHz.

At 904, the base station may transmit information associated with the coreset bandwidth to each UE in the set of UEs. For example, referring to FIG. 8A, the base station 808 may transmit information 803*a*, 803*b*, 803*c* associated with the coreset bandwidth to the first UE 802, the second UE 804, and the third UE 806, respectively.

At 906, the base station may determine a coreset of time and frequency resources within a control region of a coreset bandwidth. For example, referring to FIG. 8A, the base station 808 may determine 807 a coreset of time and frequency resources within a control region of the coreset bandwidth.

At 908, the base station may transmit a DMRS associated with the PDCCH within a first symbol period of the control region in the coreset bandwidth. For example, referring to FIG. 8B, the base station 808 may transmit a DMRS 809*a*, 809*b*, 809*c* associated with the PDCCH (e.g., an NR-PDCCH) within a first symbol period (e.g., see 610 in FIG. 6) of the control region in the coreset bandwidth to each of the first UE 802, the second UE 804, and the third UE 806, respectively.

At 910, the base station may transmit a PDCCH as a single-carrier waveform via the coreset of time and frequency resources. In one aspect, the PDCCH may be transmitted to each UE in the set of UEs using the coreset bandwidth. For example, referring to FIG. 8B, the base station 808 may transmit a PDCCH 811*a*, 811*b*, 811*c* as a single-carrier waveform (e.g., DFT-S-FDMA waveform) to the first UE 802, the second UE 804, and the third UE 806, respectively. In certain aspects, the PDCCH 811*a*, 811*b*, 811*c* may be transmitted via the coreset of time and frequency resources using the coreset bandwidth.

At 912, the base station may transmit the PDCCH as the single-carrier waveform via the coreset of time and frequency resources by transmitting data of the PDCCH in a second symbol period of the control region in the coreset bandwidth. For example, referring to FIG. 8B, the base station 808 may transmit data of the PDCCH 811*a*, 811*b*, 811*c* in a second symbol period (e.g., see 612 in FIG. 6) of the control region in the coreset bandwidth.

Figure 10:
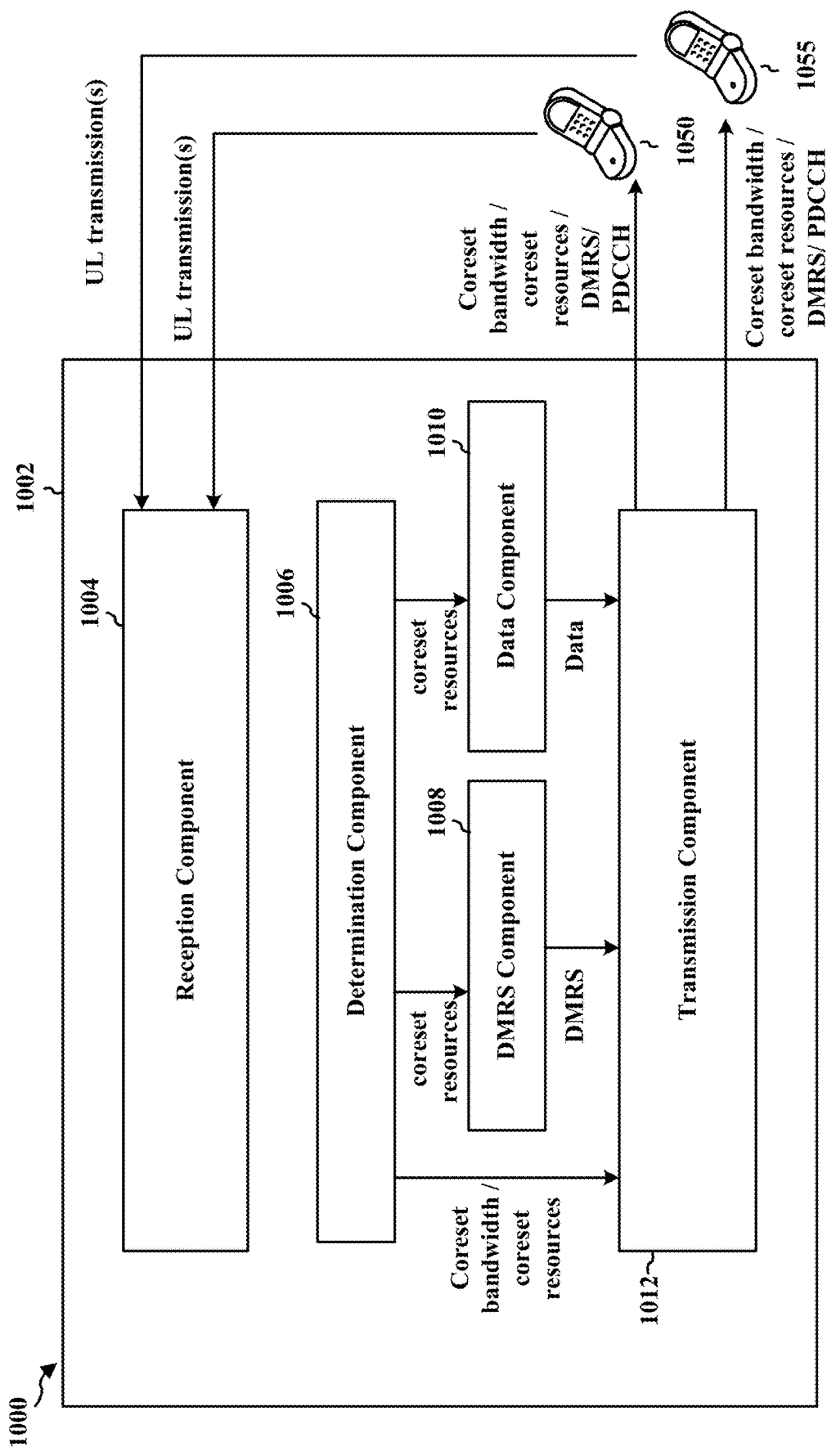
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station (e.g., the base station 102, 180, 310, 808, 1350, the apparatus 1002/1002') in communication with a first UE 1050 (e.g., the UE 104, 350, 702, 704, 706, 802, 804, 806, apparatus 1302/1302') and a second UE 1055 (e.g., the UE 104, 350, 702, 704, 706, 802, 804, 806, apparatus 1302/1302'). The first UE 1050 and the second UE 1055 may be a set of UEs. The apparatus may include a reception component 1004, a determination component 1006, a DMRS component 1008, a data component 1010, and a transmission component 1012. The determination component 1006 may be configured to determine a coreset bandwidth based on a minimum bandwidth configuration associated with one or more UEs in a set of UEs 1050, 1055. In one aspect, the first UE 1050 and the second UE 1055 may be located within a region associated with the apparatus. In addition, the determination component 1006 may send a signal associated with the coreset bandwidth to one or more of the DMRS component 1008, the data component 1010, and/or the transmission component 1012. The transmission component 1012 may be configured to transmit information associated with the coreset bandwidth to each UE in the set of UEs 1050, 1055. The determination component 1006 may further be configured to determine a coreset of time and frequency resources within a control region of a coreset bandwidth. In addition, the determination component 1006 may send a signal to one or more of the DMRS component 1008, the data component 1010, and/or the transmission component 1012 associated with the coreset of time and frequency resources within the control region of the coreset bandwidth. The DMRS component 1008 may be configured to determine and/or generate one or more DMRS associated with a PDCCH within a first symbol period of the control region. In addition, the DMRS component 1008 may send a signal associated with the DMRS to the transmission component 1012. The transmission component 1012 may be configured to transmit the DMRS associated with the PDCCH within a first symbol period of the control region in the coreset bandwidth. The data component 1010 may be configured to determine and/or generate data in a second symbol period of the control region in the coreset bandwidth. In addition, the transmission component 1012 may be configured to transmit a PDCCH as a single-carrier waveform via the coreset of time and frequency resources. In one aspect, the PDCCH may be transmitted to each UE in the set of UEs 1050, 1055 using the coreset bandwidth. In another aspect, the transmission component 1012 may be configured to transmit a PDCCH as a single-carrier waveform via the coreset of time and frequency resources by transmitting data of the PDCCH in a second symbol period of the control region in the coreset bandwidth. The reception component 1004 may be configured to receive UL transmissions from the first UE 1050 and/or the second UE 1055.

The apparatus may include additional components that perform each of the blocks of the algorithm in the aforementioned flowchart of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
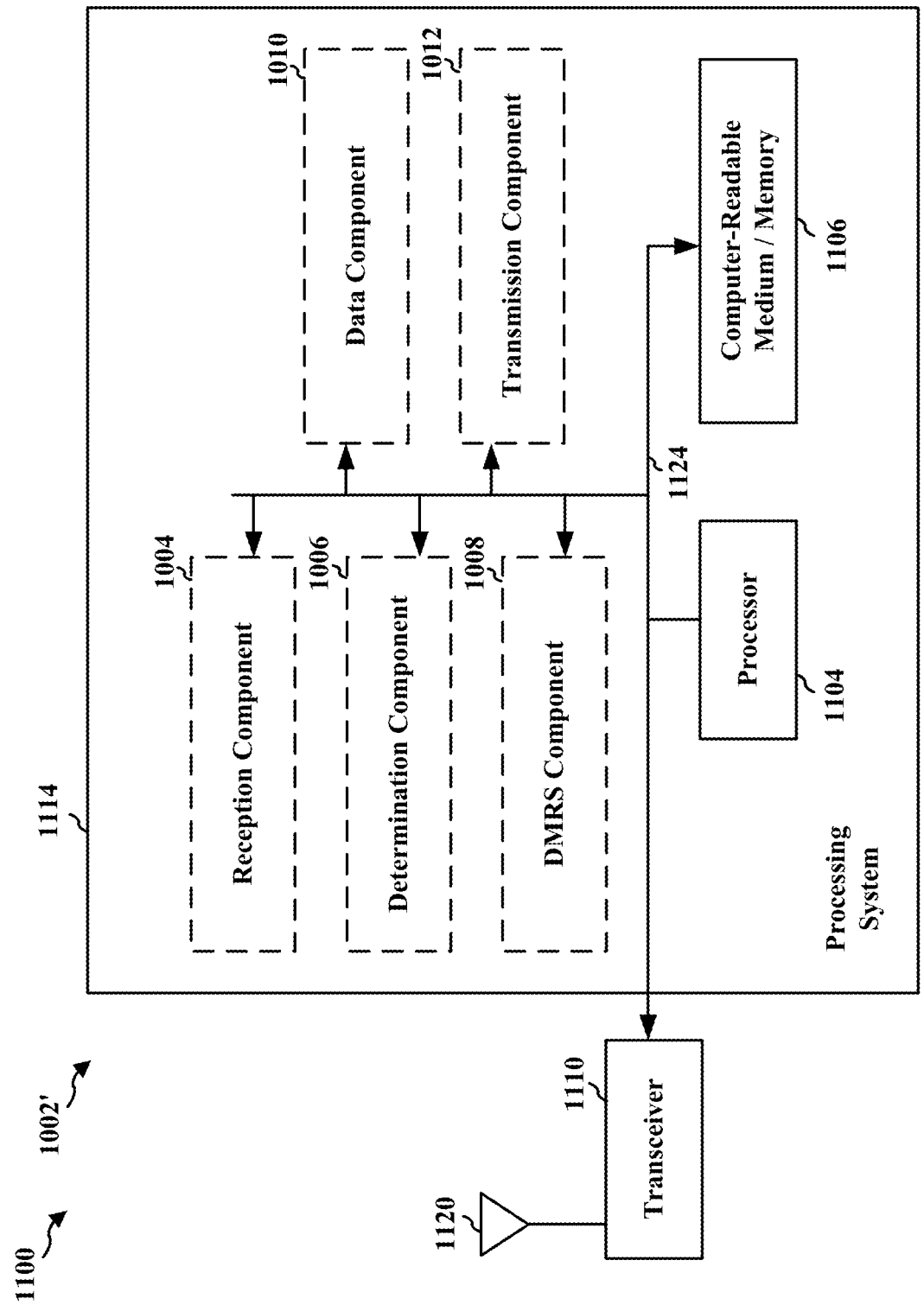
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012.

The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication may include means for determining a coreset bandwidth based on a minimum bandwidth configuration associated with one or more UEs in a set of UEs. In one aspect, each UE in the set of UEs may be located within a region associated with the base station. In another configuration, the apparatus 1002/1002' for wireless communication may include means for may transmitting information associated with the coreset bandwidth to each UE in the set of UEs. In a further configuration, the apparatus 1002/1002' for wireless communication may include means for determining a coreset of time and frequency resources within a control region of a coreset bandwidth. In one configuration, the apparatus 1002/1002' for wireless communication may include means for transmitting a DMRS associated with the PDCCH within a first symbol period of the control region in the coreset bandwidth. In another configuration, the apparatus 1002/1002' for wireless communication may include means for transmitting a PDCCH as a single-carrier waveform via the coreset of time and frequency resources. In one aspect, the PDCCH may be transmitted to each UE in the set of UEs using the coreset bandwidth. In one aspect, the means for transmitting the PDCCH may be configured to transmit data of the PDCCH in a second symbol period of the control region in the coreset bandwidth. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
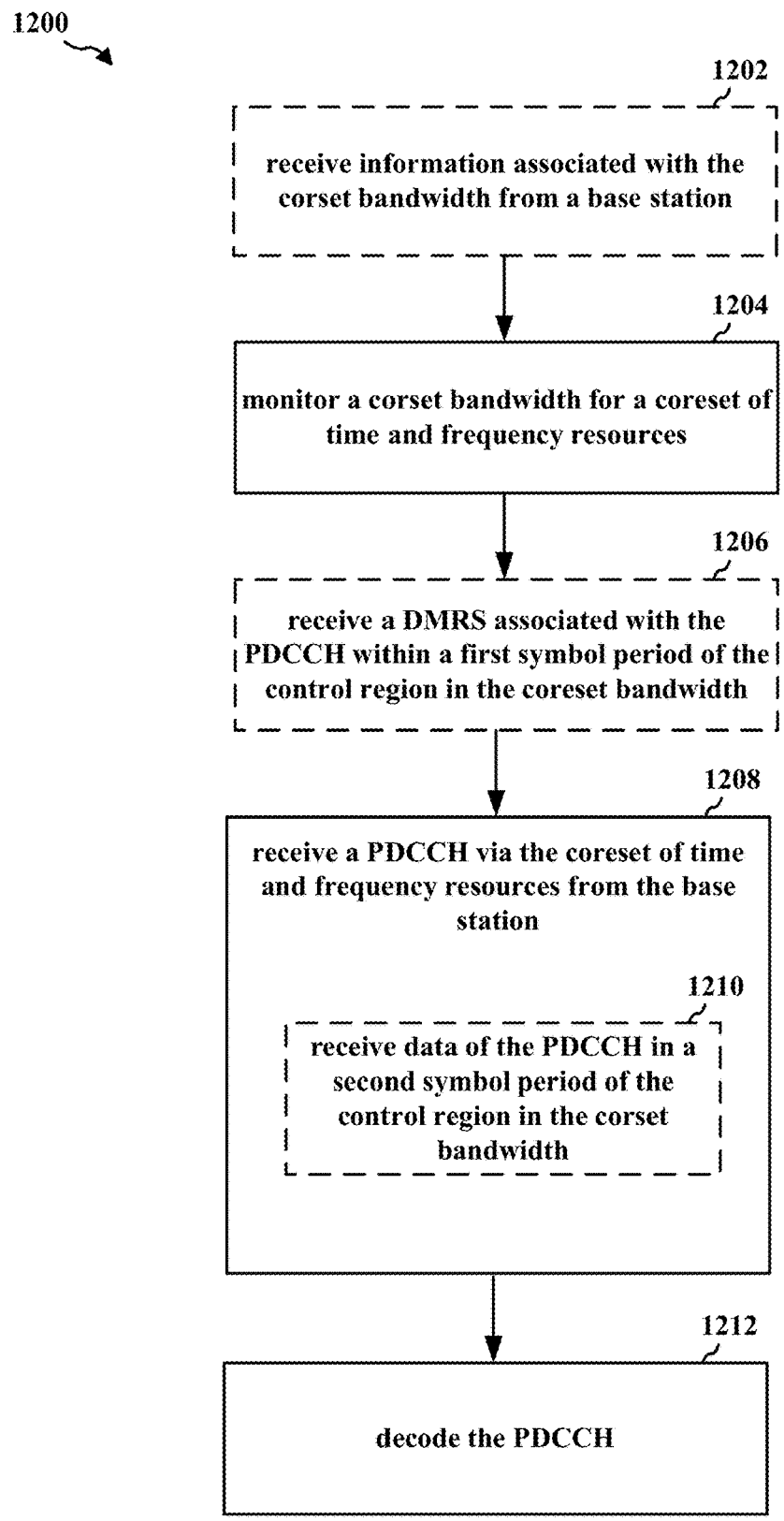
FIG. 12 is a flowchart of a method of wireless communication.

FIG. 12 is a flowchart 1200 of a method of wireless communication. The method may be performed by a UE (e.g., the UE 104, 350, 702, 704, 706, 802, 804, 806, 1050, 1055, apparatus 1302/1302') in communication with a base station (e.g., the base station 102, 180, 310, 808, 1250, the apparatus 1002/1002'). In FIG. 12, operations indicated with dashed lines may represent optional operations.

At 1202, the UE may receive information associated with a coreset bandwidth from a base station. In one aspect, the coreset bandwidth may be equal to a maximum bandwidth configuration of the UE. In another aspect, the coreset bandwidth may be less than a maximum bandwidth configuration of the UE. For example, referring to FIG. 8A, the first UE 802, the second UE 804, and the third UE 806 may receive information 803a, 803b, 803c associated with a coreset bandwidth, respectively. For example, assume the first UE 802 has a bandwidth configuration of W MHz (e.g. M×15 KHz=W MHz, where M is the number of subcarriers in the bandwidth configuration of the first UE 802). In addition, assume the second UE 804 has a bandwidth configuration of X MHz (e.g., N×15 KHz=X MHz, where N is the number of subcarriers in the bandwidth configuration of the second UE 804, and W<X). Further, assume the third UE 806 has a bandwidth configuration of Y MHz (e.g., P×15

KHz=Y MHz, where P is the number of subcarriers in the bandwidth configuration of the third UE 806, and W<X<Y). In addition, assume the coreset bandwidth is defined as the minimum bandwidth configuration of the set of UEs 802, 804, 806. Hence, based on the example described supra, the base station 808 may determine 801 that the coreset bandwidth is W MHz.

At 1204, the UE may monitor a coreset bandwidth for a coreset of time and frequency resources. In one aspect, the coreset bandwidth may be based on a minimum bandwidth configuration associated with one or more UEs in a set of UEs. For example, referring to FIG. 8A, the first UE 802, the second UE 804, and the third UE 806 may monitor 805*a*, 805*b*, 805*c* the coreset bandwidth for coreset resources transmitted by the base station 808.

At 1206, the UE may receive a DMRS associated with the PDCCH within a first symbol period of the control region in the coreset bandwidth. For example, referring to FIG. 8B, the first UE 802, the second UE 804, and the third UE 806 may receive a DMRS 809*a*, 809*b*, 809*c* associated with the PDCCH (e.g., an NR-PDCCH) within a first symbol period (e.g., see 610 in FIG. 6) of the corset bandwidth, respectively.

At 1208, the UE may receive a PDCCH via the coreset of time and frequency resources from a base station. In one aspect, the PDCCH may be received in the coreset bandwidth as a single-carrier waveform. For example, referring to FIG. 8B, the first UE 802, the second UE 804, and the third UE 806 may receive a PDCCH 811*a*, 811*b*, 811*c* as a single-carrier waveform (e.g., DFT-S-FDMA waveform), respectively. For example, the PDCCH 811*a*, 811*b*, 811*c* may be received via the coreset of time and frequency resources using the coreset bandwidth.

At 1210, the UE may receive data carried on the PDCCH in a second symbol period of the control region in the coreset bandwidth. For example, referring to FIG. 8B, the first UE 802, the second UE 804, and the third UE 806 may receive a PDCCH 811*a*, 811*b*, 811*c* that includes the data of the PDCCH in a second symbol period (e.g., see 612 in FIG. 6) of the control region in the coreset bandwidth.

At 1212, the UE may decode the PDCCH. For example, referring to FIG. 8B, first UE 802, the second UE 804, and the third UE 806 may decode 813*a*, 813*b*, 813*c* respective coreset control information in the PDCCH.

Figure 13:
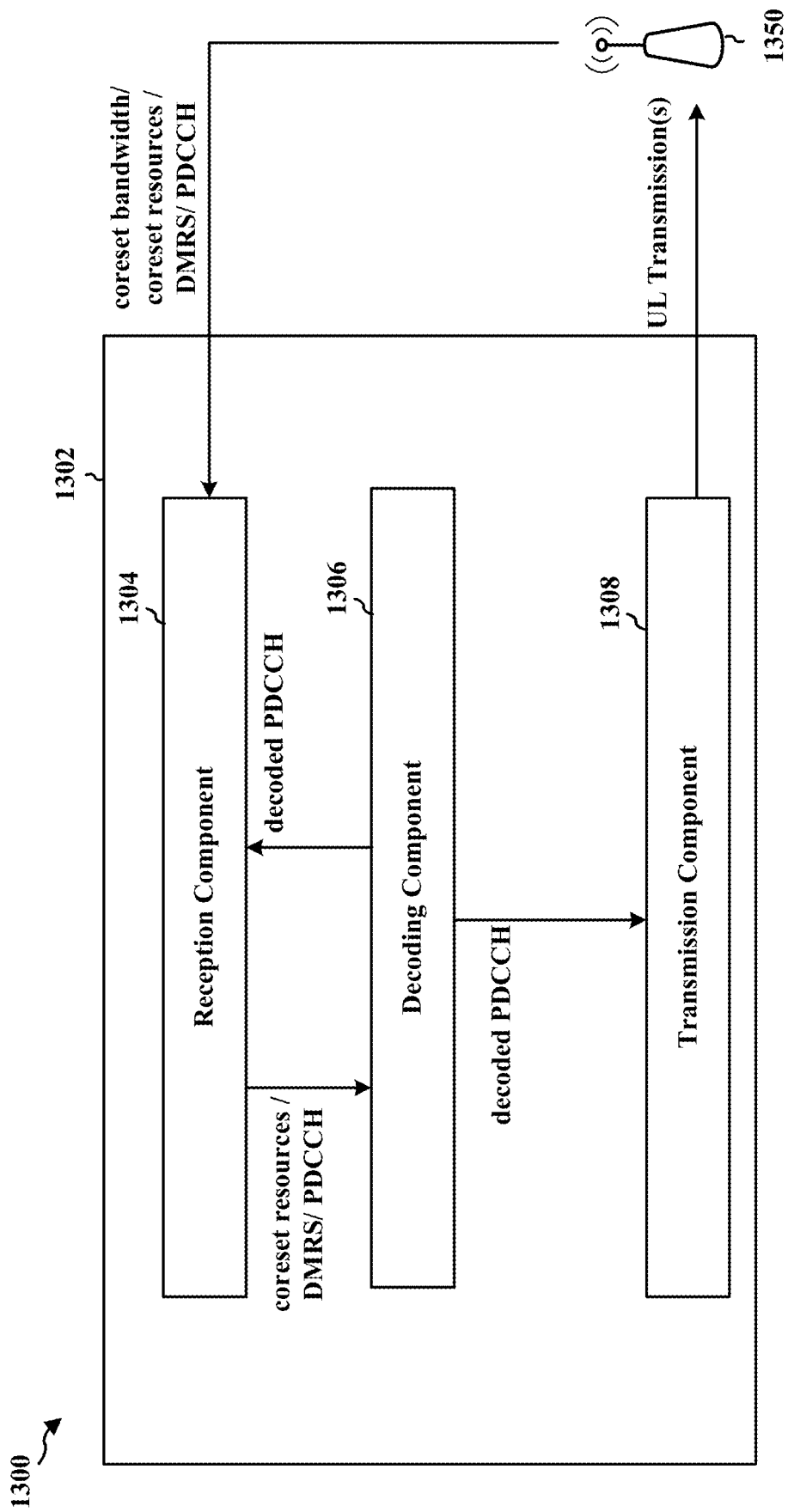
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., the UE 104, 350, 702, 704, 706, 802, 804, 806, 1050, 1055, apparatus 1302/1302') in communication with a base station 1350 (e.g., the base station 102, 180, 310, 808, the apparatus 1002/1002'). The apparatus may include a reception component 1304, a decoding component 1306, and a transmission component 1308. The reception component 1304 may be configured to receive information associated with the coreset bandwidth from the base station 1350. In one aspect, the coreset bandwidth may be equal to a maximum bandwidth configuration of the UE. In another aspect, the coreset bandwidth may be less than a maximum bandwidth configuration of the UE. In addition, the reception component 1304 may be configured to monitor a coreset bandwidth for a coreset of time and frequency resources. In one aspect, the coreset bandwidth may be based on a minimum bandwidth configuration associated with one or more UEs in a set of UEs. Further, the reception component 1304 may be configured to receive a DMRS associated with the PDCCH within a first symbol period of the control region in the coreset bandwidth. The reception component 1304 may send a signal associated the DMRS to the decoding component 1306. Additionally, the reception component 1304 may be configured to receive a PDCCH via the coreset of time and frequency resources from the base station 1350. In one aspect, the PDCCH may be received in the coreset bandwidth as a single-carrier waveform. In one aspect, the reception component 1304 may be configured to receive the PDCCH via the coreset of time and frequency resources by receiving data of the PDCCH in a second symbol period of the control region in the coreset bandwidth. The reception component 1304 may send a signal associated with the PDCCH and/or the data of the PDCCH to the decoding component 1306. The decoding component 1306 may be configured to decode the PDCCH. The transmission component 1308 may be configured to send UL transmissions to the base station 1350.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
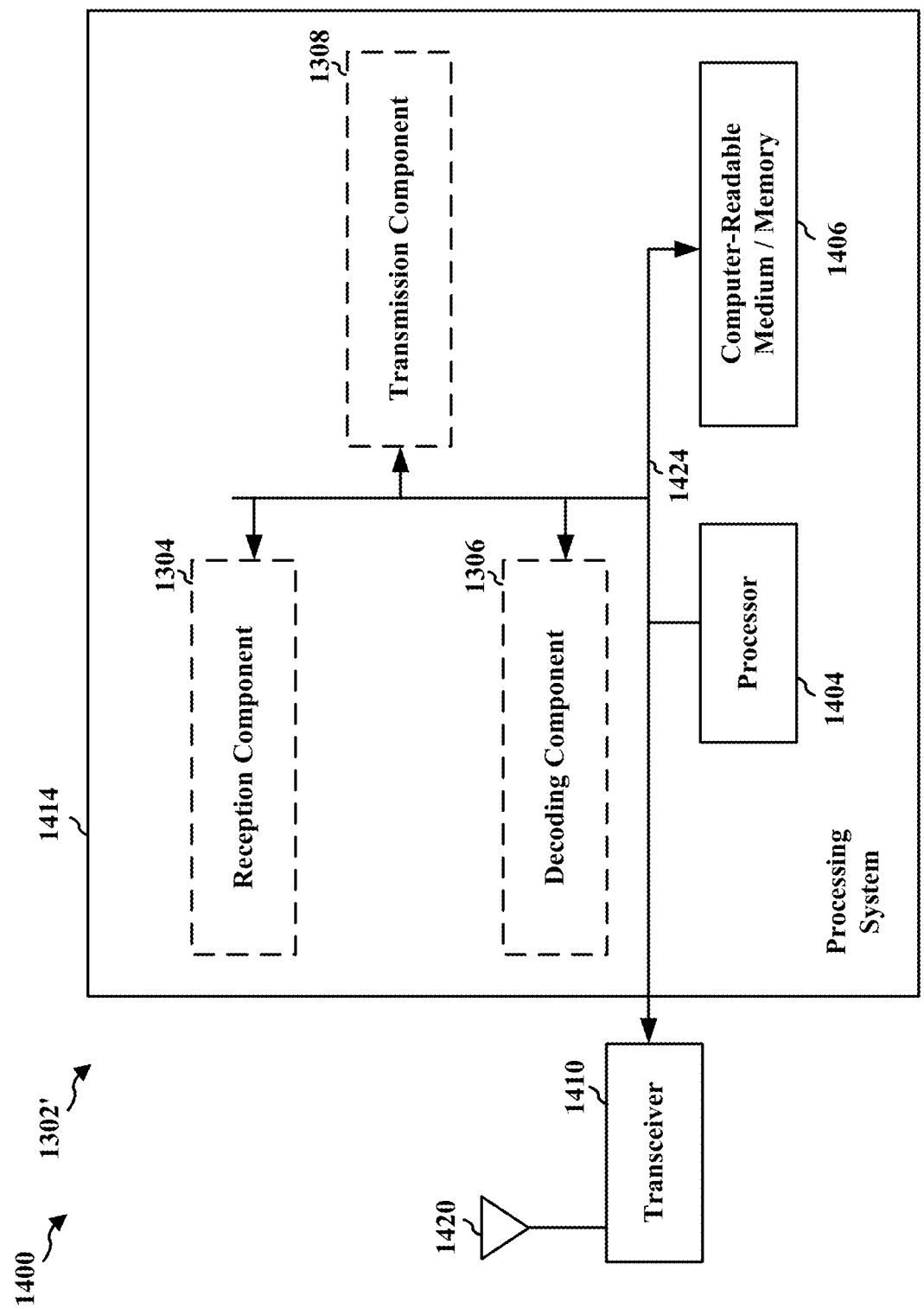
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication may include means for receiving information associated with a coreset bandwidth from a base station. In one aspect, the coreset bandwidth may be equal to a maximum bandwidth configuration of the UE. In another aspect, the coreset bandwidth may be less than a maximum bandwidth configuration of the UE. In another configuration, the apparatus 1302/1302' for wireless communication may include means for monitoring a coreset bandwidth for a coreset of time and frequency resources. In one aspect, the coreset bandwidth may be based on a minimum bandwidth configuration associated with one or more UEs in a set of UEs. In a further configuration, the apparatus 1302/1302' for wireless communication may include means for receiving a DMRS associated with the PDCCH within a first symbol period of the control region in the coreset bandwidth. In one configuration, the apparatus 1302/1302' for wireless communication may include means for receiving a PDCCH via the coreset of time and frequency resources from a base station. In one aspect, the PDCCH may be received in the coreset bandwidth as a single-carrier waveform. In one aspect, the means for receiving a PDCCH via the coreset of time and frequency resources may be configured to receive data of the PDCCH in a second symbol period of the control region in the coreset bandwidth. In a further configuration, the apparatus 1302/1302' for wireless communication may include means for decoding the PDCCH. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
    determining a control resource set (coreset) bandwidth from a minimum bandwidth configuration of one or more user equipments (UEs) in a set of UEs;
    determining a coreset of time and frequency resources within a control region of the coreset bandwidth, the coreset bandwidth being the minimum bandwidth configuration of the one or more UEs in the set of UEs, wherein at least one coreset resource for each of the one or more UEs is located within the coreset bandwidth;
    transmitting a physical downlink control channel (PDCCH) as a single-carrier waveform via the coreset of time and frequency resources, the PDCCH being transmitted to each UE in the set of UEs using the coreset bandwidth, wherein the PDCCH includes coreset control information for each of the one or more UEs; and
    transmitting a demodulation reference signal (DMRS) associated with the PDCCH within a first symbol period of the control region in the coreset bandwidth, wherein the transmitting the PDCCH further comprises transmitting data of the PDCCH in a second symbol period of the control region in the coreset bandwidth.

2. The method of claim 1, further comprising:
    transmitting information associated with the coreset bandwidth to each UE in the set of UEs.

3. The method of claim 1, wherein each UE in the set of UEs is located within a region associated with the base station.

4. A method of wireless communication of a user equipment (UE), comprising:
    monitoring a control resource set (coreset) bandwidth for a coreset of time and frequency resources, the coreset bandwidth being a minimum bandwidth configuration of one or more user equipments (UEs) in a set of UEs, wherein at least one coreset resource for each of the one or more UEs is located within the coreset bandwidth; and receiving a physical downlink control channel (PDCCH) via the coreset of time and frequency resources from a base station, the PDCCH being received in the coreset bandwidth as a single-carrier waveform, wherein the PDCCH includes coreset control information for each of the one or more UEs;

receiving a demodulation reference signal (DMRS) associated with the PDCCH within a first symbol period of a control region in the coreset bandwidth, wherein the receiving the PDCCH comprises receiving data of the PDCCH in a second symbol period of the control region in the coreset bandwidth; and decoding the PDCCH.

5. The method of claim 4, further comprising:
receiving information associated with the coreset bandwidth from the base station.

6. The method of claim 4, wherein the coreset bandwidth is equal to a maximum bandwidth configuration of the UE.

7. The method of claim 4, wherein the coreset bandwidth is less than a maximum bandwidth configuration of the UE.

8. An apparatus for wireless communication of a base station, comprising:
a memory; and
at least one processor coupled to the memory and configured to:
  determine a control resource set (coreset) bandwidth from a minimum bandwidth configuration of one or more user equipments (UEs) in a set of UEs;
  determine a coreset of time and frequency resources within a control region of the coreset bandwidth, the coreset bandwidth being the minimum bandwidth configuration of the one or more UEs in the set of UEs, wherein at least one coreset resource for each of the one or more UEs is located within the corset bandwidth;
  transmit a physical downlink control channel (PDCCH) as a single-carrier waveform via the coreset of time and frequency resources, the PDCCH being transmitted to each UE in the set of UEs using the coreset bandwidth, wherein the PDCCH includes coreset control information for each of the one or more UEs; and
  transmit a demodulation reference signal (DMRS) associated with the PDCCH within a first symbol period of the control region in the coreset bandwidth, wherein the at least one processor is configured to transmit the PDCCH by transmitting data of the PDCCH in a second symbol period of the control region in the coreset bandwidth.

9. The apparatus of claim 8, wherein the at least one processor is further configured to:
transmit information associated with the coreset bandwidth to each UE in the set of UEs.

10. The apparatus of claim 8, wherein each UE in the set of UEs is located within a region associated with the base station.

11. An apparatus for wireless communication of a user equipment (UE), comprising:
a memory; and
at least one processor coupled to the memory and configured to:
  monitor a control resource set (corset) bandwidth for a coreset of time and frequency resources, the coreset bandwidth being the minimum bandwidth configuration of one or more user equipments (UEs) in a set of UEs, wherein at least one coreset resource for each of the one or more UEs is located within the corset bandwidth;
  receive a physical downlink control channel (PDCCH) via the coreset of time and frequency resources from a base station, the PDCCH being received in the coreset bandwidth as a single-carrier waveform, wherein the PDCCH includes coreset control information for each of the one or more UEs;
  receive a demodulation reference signal (DMRS) associated with the PDCCH within a first symbol period of a control region in the coreset bandwidth, wherein the at least one processor is configured to receive the PDCCH by receiving data of the PDCCH in a second symbol period of the control region in the coreset bandwidth; and
  decode the PDCCH.

12. The apparatus of claim 11, wherein the at least one processor is further configured to:
receive information associated with the coreset bandwidth from the base station.

13. The apparatus of claim 11, wherein the coreset bandwidth is equal to a maximum bandwidth configuration of the UE.

14. The apparatus of claim 11, wherein the coreset bandwidth is less than a maximum bandwidth configuration of the UE.

* * * * *